United States Patent Office 2,717,200
Patented Sept. 6, 1955

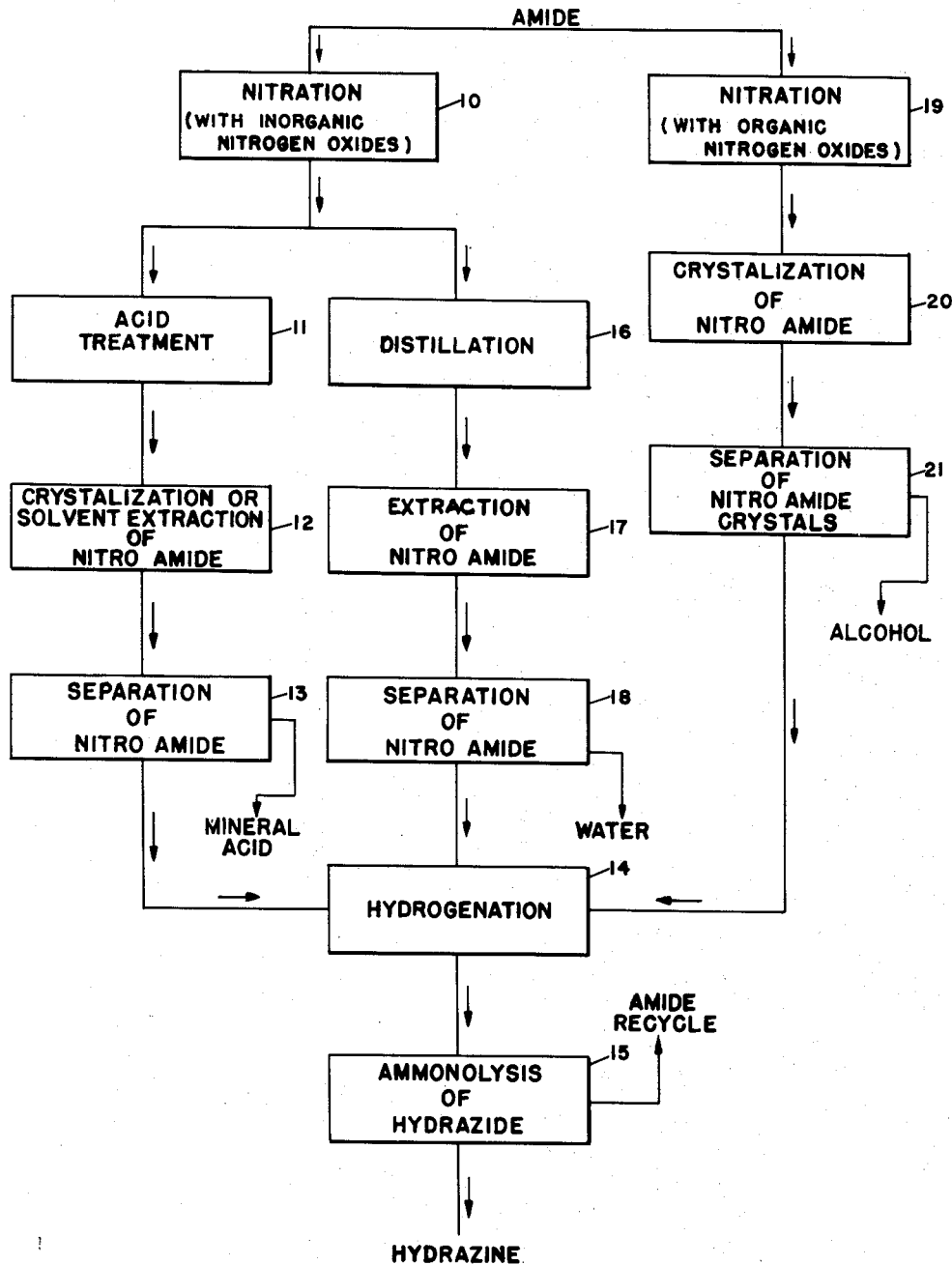

2,717,200

MANUFACTURE OF HYDRAZINE

William E. Hanford, Short Hills, N. J., assignor to The M. W. Kellogg Company, Jersey City, N. J., a corporation of Delaware Application April 4, 1950, Serial No. 153,984

25 Claims. (Cl. 23—190)

This invention relates to the manufacture of hydrazine. In one aspect the invention relates to a process for the manufacture of hydrazine from amido compounds comprising primary and substituted amides or their derivatives. An object of the invention is to provide an efficient process for the manufacture of hydrazine from readily available starting material. Another object of the invention is to provide a process for the manufacture of hydrazine in relatively high yields. Other objects and advantages of the invention will become apparent from the following more detailed disclosure.

According to this invention, the production of hydrazine in relatively high yields is obtained, generally, by the nitration of suitable amido compounds to produce the corresponding nitro amide, followed by hydrogenation of the nitro amide to its corresponding hydrazide, and finally subjecting the hydrazide to ammonolysis to produce hydrazine.

The amido compounds employed in the initial nitration step may be either primary or substituted amides or their derivatives. The amido compounds are highly desirable because their relatively low molecular weight facilitates the ease of nitration and because they are readily available. Suitable amido compounds are urea, formamide, acetamide, benzamide and lauramide. The nitrating agents employed in converting the amide to its corresponding nitro amide may be either inorganic or organic oxides of nitrogen. Examples of suitable inorganic oxides of nitrogen as the nitrating agent, are nitric acid or nitrogen dioxide; while examples of suitable organic oxides of nitrogen as the nitrating agent, are alkyl nitrates such as methyl nitrate, ethyl nitrate or amyl nitrate.

In carrying out the nitration of the amido compound, the amide and nitrating agent are reacted in stoichiometric proportions, so that one molecule of the amide is reacted with one molecule of the nitrating agent to produce one molecule of the nitro amide. If the nitrating agent is an inorganic oxide of nitrogen, such as nitric acid, there will also be formed a molecule of water in addition to the nitro amide molecule. Thus employing urea as a suitable amide and nitric acid having a concentration of at least about 10% as a suitable nitrating agent, the reaction proceeds as follows:

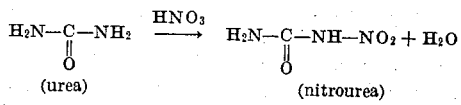

(urea)   (nitrourea)

On the other hand, if the nitrating agent is an organic oxide of nitrogen, such as methyl nitrate, there will also be formed a molecule of the corresponding alcohol of the nitrating agent, in addition to the nitro amide molecule. Thus, employing urea as a suitable amide and methyl nitrate as a suitable nitrating agent, the reaction proceeds as follows:

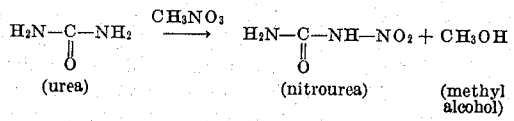

(urea)   (nitrourea)   (methyl alcohol)

When inorganic oxides of nitrogen are employed as the nitrating agent to produce the intermediate nitro amide of the present invention, the reaction may be carried out in a suitable mixing vessel with sufficient stirring or agitation to assure complete reaction. When the reaction is carried out in this manner, it has been found desirable to pour the reaction mixture thus obtained into a strong mineral acid, such as concentrated sulfuric acid or hydrofluoric acid, to aid in the nitration and to prevent any reversion of the produced nitro amide back to the amido starting material. In essence, the function of the mineral acid is to promote dehydration of the intermediate amido nitrate product that is formed. The nitrating agent and the mineral acid may be employed in a mol ratio of about 1:2. The acid mixture thus produced by this nitration step is preferably next poured into water (maintained at room temperature or below, with iced-water being preferred) to obtain the nitro amide in crystalline form. The mixture thus obtained is next subjected to phase separation to obtain a solid phase comprising crystals of the nitro amide, and a liquid phase comprising the mineral acid. The nitro amide crystals are next separated by filtration from the mineral acid, and are ready for further treatment in accordance with the process hereinafter described.

If desired, the aforementioned acid mixture produced by the nitration step may be dehydrated before subjecting the nitro amide to further treatment. For this purpose the mixture is subjected to extraction treatment with a suitable solvent for the nitro amide to obtain an extract phase comprising the nitro amide, and a raffinate phase comprising water. The extract phase, containing the nitro amide, may then be subjected to further treatment in accordance with the process of the invention. Suitable solvents are diethyl ether or dioxane.

In another modification of the invention, the reaction between the amide and the inorganic nitrating agent (without the presence of the mineral acid) may be carried out in the bottom of a suitable distillation column. Heat is applied to the column and the nitro amide, previously formed, is removed as a water-azeotrope. This azeotrope is next subjected to dehydration treatment with one of the solvents, as indicated above, to obtain the desired nitro amide intermediate product as a water-free extract for further treatment, as hereinafter described.

As indicated above, when organic oxides of nitrogen are employed as nitrating agents, the reaction is carried out in a suitable mixing vessel and the resulting product comprises a mixture of the corresponding nitro amide and an alcohol. It is not practical, however, to separate the alcohol from the nitro amide by distillation, because distillation of the nitro amide without water being present in the mixture may bring about rapid decomposition of the nitro amide with the danger of explosion. Therefore, this mixture of the nitro amide and alcohol is next subjected to crystallization by chilling, employing ice or other suitable cooling means, in order to form crystals of the nitro amide present. The alcohol component of the above mixture is next separated from the thus-formed nitro amide crystals by filtration, and the crystalline residue is now ready for further treatment.

As indicated above, the intermediate nitro amide product obtained by any of the above-described methods, is next hydrogenated to its corresponding hydrazide as a second intermediate product, in accordance with the process of the invention. This water-free nitro amide product may be hydrogenated with or without the presence of a solvent treating agent, depending upon which of the aforementioned processes was employed for effecting the nitration. The nitro amide is hydrogenated in a suitable reaction vessel, with or without a suitable hydrogenation catalyst, preferably at a temperature between about 50° C. and about 400° C., and at a pressure between about 15 pounds per square inch and about 2000 pounds per square inch. Suitable hydrogenation catalysts are nickel, cobalt or iron, either supported or unsupported, or sulfur dioxide, or catalyst compositions such as zinc and mineral acids. The hydrogenation treatment, when employing solid catalysts, is preferably carried out with the catalyst in a fixed-bed state, although catalysts in a fluid-bed state may also be employed. This hydrogenation treatment effects the conversion of the nitro amide to its corresponding hydrazide, as a second intermediate product. The term "hydrazide," as used in this specification, refers to compounds characterized by the general structure:

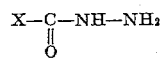

in which, X is either an amino group, such as $NH_2$, or an organic radical, such as $CH_3$, $C_5H_{11}$, or $C_6H_5$, depending upon the structure of the amido starting material. The hydrazide obtained by the above-mentioned hydrogenation treatment is obtained as an aqueous mixture and may also contain a solvent, if solvent extraction were previously employed for the purpose of dehydrating the nitro amide intermediate product. If so desired, the solvent may be separated from the hydrazide by flashing, followed by the distillation of any water that may be present; or the solvent may be retained in combination with the hydrazide for further treatment. The hydrogenation reaction, employing nitrourea as a typical nitro amide, is represented as follows:

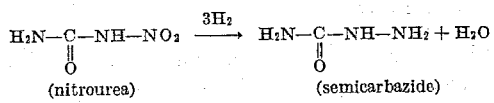

As previously indicated, the thus-formed intermediate hydrazide product is next subjected to ammonolysis with anhydrous ammonia to convert the hydrazide to the desired hydrazine end-product. The hydrazide and anhydrous ammonia are reacted in stoichiometric proportions, in which one mol of the hydrazide is reacted with one mol of ammonia. Thus, employing semicarbazide as a suitable hydrazide and anhydrous ammonia, the reaction proceeds as follows:

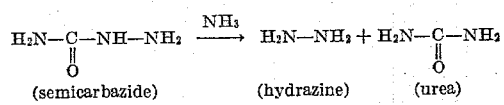

It will be noted that the ammonolysis reaction produces not only the desired hydrazine end-product, but also the initial amide starting material. The amide thus formed may be returned to the initial nitration step for further use.

The above ammonolysis of the hydrazide is carried out in a suitable pressurized vessel at a temperature between about 50° C. and about 200° C., with a temperature between about 90° C. and about 150° C. being preferred. In carrying out the ammonolysis of the hydrazide, pressures between about 200 pounds per square inch and about 2000 pounds per square inch are employed, with pressures between about 700 and about 1200 pounds per square inch being preferred. The ammonolysis is conducted in the pressurized vessel, preferably with agitation, for a period of time sufficient to insure complete reaction. The reaction time may vary from about a few minutes to several hours, depending upon the temperature and pressure conditions. The table, below, is presented to indicate the hydrazine yield obtained in a series of runs by the above ammonolysis of semicarbazide (as the hydrazide) previously obtained by the above-described nitration of urea, and hydrogenation of the nitrourea intermediate product to produce semicarbazide. The yield of hydrazine is based on reacted semicarbazide. It will be noted that the presence of residual water or solvent will not effect the yield of hydrazine produced by the ammonolysis.

Table

| Run No. | Charge in Gms., Semicarbazide | Charge in Gms., Liquid Ammonia | Time (hrs.) | Temp., deg. C. | Pressure (p. s. i.) | Percent Semicarbazide Reacted | Percent Hydrazine Yield |
| --- | --- | --- | --- | --- | --- | --- | --- |
| 1 | 7.5817 | 40.4 | 3 | 98 | 715 | 30 | 52 |
| 2 | 7.4926 | 25.7 | 3 | 111 | 920 | 32 | 65 |
| 3 | 7.5079 | 26.5 | 1½ | 102 | 770 | 24 | 90 |
| 4 | 7.5005 | 28.0 | 3 | 125 | 1,150 | 16 | 31 |
| 5 | 7.5313 | 26.4 | 3 | 148 | 1,540 | 56 | 13 |
| 6 | 7.5249 | 26.4 | ¾ | 103 | 790 | 19 | 80 |

The above runs were carried out in a Aminco pressure microbomb. In each instance, about 8 grams of semicarbazide and 30 grams of liquid ammonia were placed in the bomb. The bomb contents were heated to the temperature indicated at the vapor pressure of liquid ammonia for the given temperature. The reaction was carried out both with and without agitation for periods of time ranging from ½ to 5 hours. The temperature range covered was from about 90 to 150° C. At the end of a run, the vapor contents of the bomb were discharged while hot, into a series of either dilute sulfuric acid or cold traps. The bomb contents were recovered by washing the bomb with acid solution. The trap and bomb contents in acid solution were analyzed separately for hydrazine and unreacted semicarbazide, and the data noted as indicated in the table. The analyses indicate the degree of success in converting the semicarbazide to hydrazine.

For a fuller understanding of the process of the present invention, reference is had to the accompanying drawing which is a flow sheet of the steps pertaining to the production of hydrazine according to the procedure previously described. The amido compound is subjected to nitration, in step 10 in the drawing, with an inorganic oxide of nitrogen. In step 11 is shown the nitration treatment of step 10 being carried out in the presence of a mineral acid, as previously indicated, to produce the corresponding nitro amide. The mixture thus produced is next subjected to either crystallization or solvent extraction, in step 12, to obtain the nitro amide either in the crystalline form or as an extract, as previously described. In step 13, the nitro amide is separated either as crystals or as an extract from the mineral acid. The nitro amide thus produced is then subjected to hydrogenation in step 14 in accordance with the conditions hereinbefore described, for converting the nitro amide to its corresponding hydrazide. The hydrazide produced in hydrogenation step 14 is next subjected to ammonolysis in step 15, in accordance with the conditions hereinbefore described. Hydrazine is thus obtained as a product of the process, and the amide formed as the result of the ammonolysis is recycled to the initial nitration step.

Step 16 indicates the distillation of the nitro amide as a water-azeotrope, in another modification of the invention, in which the nitration treatment of step 10 is carried out without the presence of a mineral acid. In step 17 the nitro amide removed as a water-azeotrope from step 16, is subjected to dehydration by solvent extraction with one of the solvents, as previously indicated, to obtain the desired nitro amide intermediate product as a water-free extract. This extract is separated in separation step 18 from the water component. This separated extract is next passed to step 14 for hydrogenation treatment, and subsequent ammonolysis in step 15, as previously described.

In instances where the amido compound is subjected to nitration with organic nitrogen oxides, represented by step 19 in the drawing, the resulting mixture of the formed nitro amide and alcohol is subjected to crystallization to obtain the nitro amide in the crystalline form, as represented by crystallization step 20. The liquid alcohol component of the crystalline mixture is next separated by filtration, represented by separation step 21 in the drawing. The remaining nitro amide crystals are then subjected to hydrogenation in step 14, followed by ammonolysis of the hydrazide thus obtained in step 15, as indicated above.

Having thus described my invention, I claim:

1. A process for the manufacture of hydrazine which comprises: treating an amide, selected from the group consisting of urea, formamide, acetamide, benzamide and lauramide, with a nitrating agent comprising at least one compound selected from the group consisting of nitrogen dioxide, nitric acid and an alkyl nitrate to produce a mixture comprising the corresponding nitroamide; separating said nitro-amide from said mixture, hydrogenating said nitro-amide in the presence of a hydrogenation catalyst to produce the corresponding hydrazide; reacting said hydrazide with anhydrous ammonia to produce a mixture comprising hydrazine; and separating hydrazine from said mixture.

2. The process of claim 1 in which the amide is urea.
3. The process of claim 1 in which the amide is formamide.
4. The process of claim 1 in which the amide is acetamide.
5. The process of claim 1 in which the amide is benzamide.
6. The process of claim 1 in which the amide is lauramide.

7. A process for the manufacture of hydrazine which comprises: treating an amide, selected from the group consisting of urea, formamide, acetamide, benzamide and lauramide, with a nitrating agent comprising at least one compound selected from the group consisting of nitrogen dioxide, nitric acid and an alkyl nitrate and a mineral acid to produce a mixture comprising the corresponding nitro-amide and water; crystallizing the nitro-amide in said mixture; separating crystals of said nitro-amide from said mixture; subjecting said crystals to hydrogenation to convert said nitro-amide to the corresponding hydrazide; reacting said hydrazide with anhydrous ammonia at a temperature between about 50° C. and about 200° C. and at a pressure between about 200 pounds per square inch and about 2000 pounds per square inch to produce a mixture comprising hydrazine and said amide; and separating hydrazine from said mixture.

8. A process for the manufacture of hydrazine which comprises: treating an amide, selected from the group consisting of urea, formamide, acetamide, benzamide and lauramide, with a nitrating agent comprising at least one compound selected from the group consisting of nitrogen dioxide, nitric acid and an alkyl nitrate and a mineral acid to produce a mixture comprising the corresponding nitro-amide and water; subjecting said mixture to extraction treatment with a solvent for said nitro-amide to obtain an extract phase comprising said nitro-amide and solvent and a raffinate phase comprising water; separating said phases; separating solvent from nitro-amide in said extract phase; subjecting said nitro-amide to hydrogenation to convert said nitro-amide to the corresponding hydrazide; reacting said hydrazide with anhydrous ammonia at a temperature between about 50° C. and about 200° C. and at a pressure between about 200 pounds per square inch and about 2000 pounds per square inch to produce a mixture comprising hydrazine and said amide; and separating hydrazine from said mixture.

9. A process for the manufacture of hydrazine which comprises: treating urea with a nitrating agent comprising at least one compound selected from the group consisting of nitrogen dioxide, nitric acid and an alkyl nitrate and sulfuric acid to produce a mixture comprising nitrourea and water; crystallizing nitrourea in said mixture; separating crystals of nitrourea from said mixture; subjecting crystals of nitrourea to hydrogenation in the presence of a hydrogenation catalyst to convert said crystals to semicarbazide; reacting said semicarbazide with anhydrous ammonia at a temperature between about 90° C. and about 150° C. and at a pressure between about 700 pounds per square inch and about 1200 pounds per square inch to produce a mixture comprising hydrazine and urea; and separating hydrazine from said urea.

10. The process of claim 9 in which the nitrating agent is nitric acid.

11. The process of claim 9 in which the nitrating agent is nitrogen dioxide.

12. A process for the manufacture of hydrazine which comprises: treating urea with a nitrating agent comprising at least one compound selected from the group consisting of nitrogen dioxide, nitric acid and an alkyl nitrate and sulfuric acid to produce a mixture comprising nitrourea and water; subjecting said mixture to extraction treatment with a solvent for said nitro-amide to obtain an extract phase comprising said nitrourea and solvent and a raffinate phase comprising water; separating said phases; separating solvent from nitrourea in said extract phase; subjecting said nitrourea to hydrogenation in the presence of a hydrogenation catalyst to convert said nitrourea to semicarbazide; reacting said semicarbazide with anhydrous ammonia at a temperature between about 90° C. and about 150° C. and at a pressure between about 700 pounds per square inch and about 1200 pounds per square inch to produce a mixture comprising hydrazine and urea; and separating hydrazine from said urea.

13. The process of claim 12 in which the solvent is an ether.

14. A process for the manufacture of hydrazine which comprises: treating urea with a nitrating agent comprising at least one compound selected from the group consisting of nitrogen dioxide, nitric acid and an alkyl nitrate to produce a mixture comprising nitrourea and water; distilling water from said mixture; subjecting the remaining nitrourea to hydrogenation to convert said nitrourea to semicarbazide; reacting said semicarbazide with anhydrous ammonia at a temperature between about 90° C. and about 150° C. and at a pressure between about 700 pounds per square inch and about 1200 pounds per square inch to produce a mixture comprising hydrazine and urea; and separating hydrazine from said urea.

15. A process for the manufacture of hydrazine which comprises: treating an amide, selected from the group consisting of urea, formamide, acetamide, benzamide and lauramide, with a nitrating agent comprising an alkyl nitrate to produce a mixture comprising the corresponding nitro-amide and an alcohol; crystallizing the nitro-amide in said mixture; separating crystals of said nitro-amide from said mixture; subjecting said crystals to hydrogenation to produce the corresponding hydrazide; reacting said hydrazide with anhydrous ammonia at a temperature between about 50° C. and about 200° C. and at a pressure between about 200 pounds per square inch and about 1200 pounds per square inch to produce a mixture comprising hydrazine; and separating hydrazine from said mixture.

16. A process for the manufacture of hydrazine which comprises: treating urea with a nitrating agent comprising an alkyl nitrate to produce a mixture comprising nitrourea and an alcohol; crystallizing nitrourea in said mixture; separating crystals of nitrourea from said mixture; subjecting crystals of nitrourea to hydrogenation to convert said crystals to semicarbazide; reacting said semicarbazide with anhydrous ammonia at a temperature between about 90° and about 150° C. and at a pressure between about 700 pounds per square inch and about 1200 pounds per square inch to produce a mixture comprising hydrazine and urea; and separating hydrazine from said urea.

17. A process for the manufacture of hydrazine which comprises: reacting a hydrazide with anhydrous ammonia at a temperature between about 50° C. and about 200° C. and at a pressure between about 200 pounds per square inch and about 2000 pounds per square inch to produce a mixture comprising hydrazine and an amide; and separating hydrazine from said mixture.

18. A process for the manufacture of hydrazine which comprises: reacting a hydrazide with anhydrous ammonia at a temperature between about 90° C. and about 150° C. and at a pressure between about 700 pounds per square inch and about 1200 pounds per square inch to produce a mixture comprising hydrazine and an amide; and separating hydrazine from said mixture.

19. A process for the manufacture of hydrazine which comprises: treating an amide, selected from the group consisting of urea, formamide, acetamide, benzamide and lauramide, with a nitrating agent comprising at least one compound selected from the group consisting of nitrogen dioxide, nitric acid and an alkyl nitrate to produce a mixture comprising the corresponding nitro-amide; separating said nitro-amide from said mixture; hydrogenating said nitro-amide to produce the corresponding hydrazide; reacting said hydrazide with anhydrous ammonia to produce a mixture comprising hydrazine; and separating hydrazine from said mixture.

20. A process for the manufacture of hydrazine which comprises: reacting semicarbazide with anhydrous ammonia at a temperature between about 50° C. and about 200° C. and at a pressure between about 200 pounds per square inch and about 2000 pounds per square inch to produce a mixture comprising hydrazine and urea; and separating hydrazine from said urea.

21. A process for the manufacture of hydrazine which comprises: reacting semicarbazide with anhydrous ammonia at a temperature between about 90° C. and about 150° C. and at a pressure between about 700 pounds per square inch and about 1200 pounds per square inch to produce a mixture comprising hydrazine and urea; and separating hydrazine from said urea.

22. A process for making hydrazine which includes reacting semicarbazide with ammonia at a reaction temperature in the range of 50° C. to 200° C., and thereafter separating the resultant hydrazine from the reaction mixture.

23. A process for making hydrazine which includes reacting a hydrazide with ammonia, and thereafter separating the resultant hydrazine from the reaction mixture.

24. A process for making hydrazine which includes reacting a hydrazide with ammonia at a reaction temperature in the range of 50° C. to 200° C., and thereafter separating the resultant hydrazine from the reaction mixture.

25. A process for making hydrazine which includes reacting semicarbazide with ammonia, and thereafter separating the resultant hydrazine from the reaction mixture.

References Cited in the file of this patent

UNITED STATES PATENTS

| Number | Name | Date |
| --- | --- | --- |
| 765,164 | Callsen | July 19, 1904 |
| 1,673,499 | Dyson | June 12, 1928 |
| 1,959,503 | Seuffert et al. | May 22, 1934 |
| 2,537,791 | Schwarcz | Jan. 9, 1951 |

OTHER REFERENCES

"An Outline of Organic Chemistry," pages 137, 138 (Revised ed., 1937). Barnes and Noble, Inc., New York, N. Y.

"The Chemistry of Hydrazine," by Audrieth and Mohr. Chem. and Eng. News, pp. 3746–3749, vol. 26, No. 50, December 13, 1948.

"The Chemistry of Hydrazine," by Audrieth and Ogg, 1951 ed., pp. 14, 15, 18, 20–24, 38 and 39. John Wiley and Sons, Inc., New York, N. Y.